(12) United States Patent
Grattan et al.

(10) Patent No.: US 10,280,694 B2
(45) Date of Patent: May 7, 2019

(54) CONTRACTION JOINT WITH MULTIPLE TELESCOPING SECTIONS

(71) Applicant: Schlumberger Technology Corporation, Sugar Land, TX (US)

(72) Inventors: Mark Grattan, Pearland, TX (US); Leonid Semin, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 104 days.

(21) Appl. No.: 15/127,288

(22) PCT Filed: Mar. 19, 2015

(86) PCT No.: PCT/US2015/021490
§ 371 (c)(1),
(2) Date: Sep. 19, 2016

(87) PCT Pub. No.: WO2015/143171
PCT Pub. Date: Sep. 24, 2015

(65) Prior Publication Data
US 2017/0183918 A1 Jun. 29, 2017

Related U.S. Application Data

(60) Provisional application No. 61/968,113, filed on Mar. 20, 2014, provisional application No. 61/968,131, filed on Mar. 20, 2014, provisional application No. 61/955,551, filed on Mar. 19, 2014.

(51) Int. Cl.
| | |
|---|---|
| *E21B 17/07* | (2006.01) |
| *E21B 17/02* | (2006.01) |
| *F16L 27/12* | (2006.01) |
| *F16L 39/04* | (2006.01) |

(52) U.S. Cl.
CPC .............. *E21B 17/07* (2013.01); *E21B 17/02* (2013.01); *E21B 17/028* (2013.01); *F16L 27/12* (2013.01); *F16L 39/04* (2013.01)

(58) Field of Classification Search
CPC ....... E21B 17/07; E21B 17/023; E21B 17/028
See application file for complete search history.

(56) References Cited

U.S. PATENT DOCUMENTS 2,706,616 A * 4/1955 Osmun ................. E21B 17/003
174/68.1
4,416,494 A * 11/1983 Watkins ................ E21B 17/003
175/45

(Continued)

OTHER PUBLICATIONS

International Search Report and Written Opinion for corresponding PCT Application Serial No. PCT/US2015/021490, dated Jul. 7, 2015, 12 pages.

(Continued)

*Primary Examiner* — Shane Bomar

(57) ABSTRACT

An expandable contraction joint is disclosed. Telescoping sections form a contraction joint with an expandable control line (electric, hydraulic or combination) extends through the contraction joint. An external mandrel provides superior mechanical support. The control line can be coiled within the contraction joint to accommodate the changing length.

20 Claims, 2 Drawing Sheets

(56) References Cited

U.S. PATENT DOCUMENTS

| | | | | |
|---|---|---|---|---|
| 4,600,059 A | * | 7/1986 | Eggleston | E21B 17/028 |
| | | | | 166/385 |
| 5,170,843 A | | 12/1992 | Taylor | |
| 6,349,770 B1 | * | 2/2002 | Brooks | E21B 17/07 |
| | | | | 166/242.7 |
| 7,225,876 B2 | * | 6/2007 | Laureano | H01R 13/523 |
| | | | | 166/343 |
| 9,371,703 B2 | * | 6/2016 | Roane | E21B 33/0407 |
| 2003/0070842 A1 | | 4/2003 | Bailey et al. | |
| 2005/0072564 A1 | * | 4/2005 | Grigsby | E21B 17/023 |
| | | | | 166/65.1 |
| 2006/0000618 A1 | | 1/2006 | Cho et al. | |
| 2008/0210439 A1 | | 9/2008 | Angman et al. | |
| 2009/0032268 A1 | * | 2/2009 | Blanton | E21B 17/028 |
| | | | | 166/386 |
| 2010/0101778 A1 | * | 4/2010 | Lembcke | E21B 17/026 |
| | | | | 166/207 |
| 2010/0300698 A1 | * | 12/2010 | Bedouet | E21B 17/003 |
| | | | | 166/355 |
| 2012/0073878 A1 | | 3/2012 | Zulak et al. | |
| 2015/0204145 A1 | * | 7/2015 | Richards | E21B 17/026 |
| | | | | 166/380 |
| 2016/0230477 A1 | * | 8/2016 | Tilley | H01R 13/5219 |
| 2017/0328141 A1 | * | 11/2017 | Richards | E21B 17/07 |

OTHER PUBLICATIONS

First Examination Report for corresponding GCC Application Serial No. 2015/29095, dated Mar. 22, 2018, 5 pages.

* cited by examiner

CONTRACTION JOINT WITH MULTIPLE TELESCOPING SECTIONS

CROSS REFERENCE TO RELATED APPLICATIONS

This application claims priority to U.S. Provisional Patent Application No. 61/968,113, filed Mar. 20, 2014, entitled CONTRACTION JOINT WITH LOAD-BEARING EXTERNAL MANDREL, 61/968,131, filed Mar. 20, 2014, entitled CONTRACTION JOINT WITH MULTIPLE TELESCOPING SECTIONS, and 61/955,551, filed Mar. 19, 2014, entitled SECTIONAL CONTRACTION JOINT WITH BY-PASS LINES, all of which are incorporated herein by reference in their entireties.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Information from the wells can prove valuable, but reliably obtaining useful information from the well is difficult. Some connections between completion sections are spaced apart at an unknown distance. Also, some completions equipment is long enough that transporting and assembly is challenging. For these reasons a contraction joint capable of bridging the gap between completion sections that is easily assembled at the well site is desired.

SUMMARY

Figure 1:
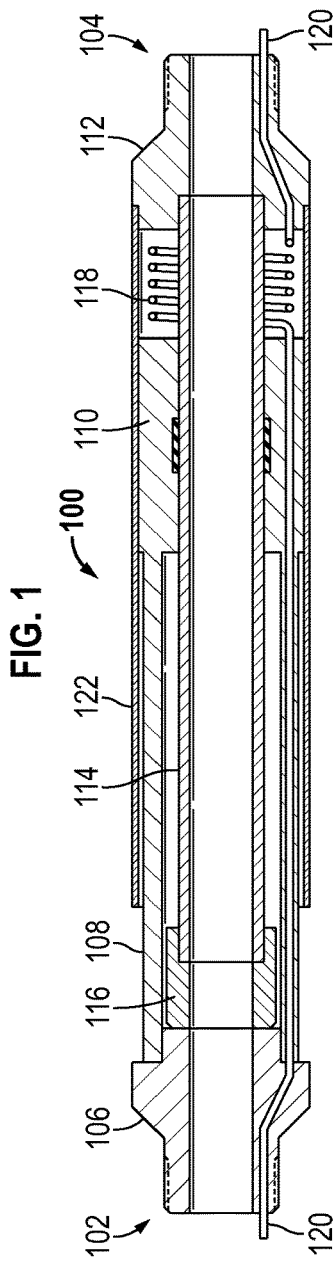
FIG. 1 is an illustration of a contraction joint according to embodiments of the present disclosure in a contracted state.

In some embodiments the present disclosure is directed to a contraction joint including an upper portion having a first mandrel, an upper sub, and an activation sub. The first mandrel extends between the upper sub and the activation sub, and the first mandrel has a smaller exterior diameter than the activation sub and the upper sub. The contraction joint also includes a lower portion having a second mandrel, a lower sub, and an upper shoulder. The second mandrel extends between the lower sub and the upper shoulder, and the second mandrel has smaller exterior diameter than the lower sub and the upper shoulder. The upper and lower portion telescope relative to one another to move from a contracted position to an extended position. The activation sub of the upper portion is between the lower sub and upper shoulder of the lower portion to define the telescoping travel of the joint. The contraction joint also includes an extendible line configured to expand and contract within the contraction joint as the contraction joint moves between extended and contracted positions. The extendible line is coupled through the upper sub and lower sub.

Further embodiments of the present disclosure are directed to a contraction joint configured to connect between a first completion component above the contraction joint and a second completion component below the contraction joint. The contraction joint includes an upper portion comprising a first mandrel and a lower portion comprising a second mandrel. The first and second mandrels are configured to telescope relative to one another to extend and contract. The contraction joint also includes a control line extending through the contraction joint and configured to connect to the first and second completion components through the contraction joint. The control line has an extendible portion configured to extend and contract with the contraction joint as the upper and lower portions telescope relative to one another.

Still further embodiments of the present disclosure are directed to a method of deploying a contraction joint. The method includes positioning a contraction joint in a wellbore, the contraction joint including a first portion and a second portion that telescope relative to one another and contain an expandable control line extending through the contraction joint, and coupling the contraction joint to a first and second completion component between the first and second completion component. The method also includes expanding the contraction joint to a suitable length between the first and second completion components, and expanding a control line segment within the contraction joint to accommodate the expanded contraction joint. The control line communicates between the first and second completion components through the contraction joint.

DETAILED DESCRIPTION

In the following description, numerous details are set forth to provide an understanding of the present disclosure. However, it will be understood by those skilled in the art that the embodiments of the present disclosure may be practiced without these details and that numerous variations or modifications from the described embodiments may be possible.

Figure 2:
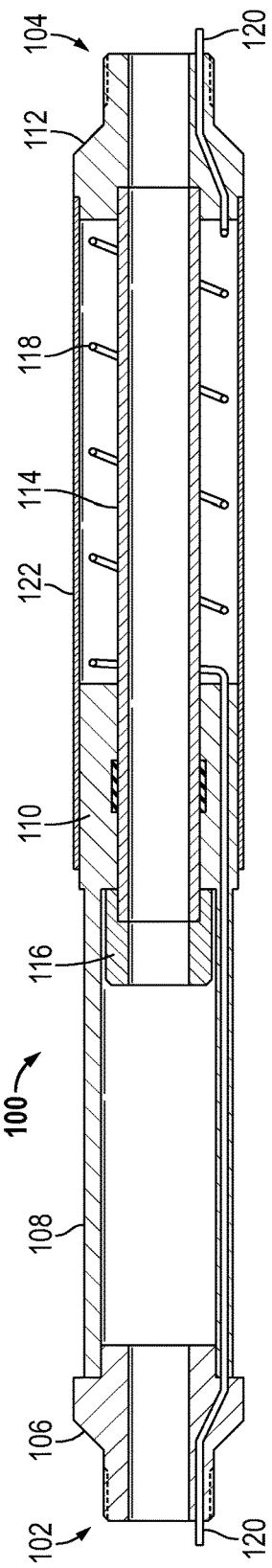
FIG. 2 is an illustration of a contraction joint of FIG. 1 in an expanded state.

Embodiments of the present disclosure are directed to a telescoping contraction joint 100 as shown in FIGS. 1 and 2 in contracted and telescoped states, respectively. The contraction joint 100 includes a top portion 102 and a bottom portion 104 that telescope relative to one another as needed to accommodate a gap between completion equipment in a well. The top portion 102 includes an upper sub 106, an upper mandrel 108, and an activation sub 110. The upper sub 106 is configured to engage with completion equipment above the joint 100. The upper mandrel 108 is thinner than the upper sub 106 and the activation sub 110 to form a shoulder that limits the extension of the joint 100.

The bottom portion 104 includes a lower sub 112, a lower mandrel 114, and an upper shoulder 116. The lower mandrel 114 has a smaller outer diameter than the lower sub 112 and the upper shoulder 116. The activation sub 110 is situated between the lower sub 112 and the upper shoulder 116 such that the activation sub 110 contacting the upper shoulder 116 and lower sub 112 defines the extent of travel of the upper portion 102 relative to the lower portion 114. FIG. 2 shows the upper portion 102 and lower portion 104 in an extended position with the upper shoulder 116 contacting the activation sub 110.

The lower portion 104 also includes a coiled line 118, shown in cross-section in a contracted state in FIG. 1 and an extended state in FIG. 2. The coiled line 118 is a continuation of a line 120 extending through the upper sub 106 and lower sub 112. The coiled line 118 and line 120 can be an electric line, a hydraulic line, or any combination thereof, and can include multiple lines. The lower portion 104 also includes an external mandrel 122 extending over a portion of the joint 100 to provide mechanical strength and support to the joint 100. In some embodiments the external mandrel 122 is load-bearing and provides a greater degree of resistance to bending forces on the contraction joint 100.

The structure of the joint allows for efficient connection to other completion components in the well. The upper sub 106 and lower sub 112 include connections to the other components, including connections for the line 120. This eliminates the need for a splice within the contraction joint 100 itself.

Figure 3:
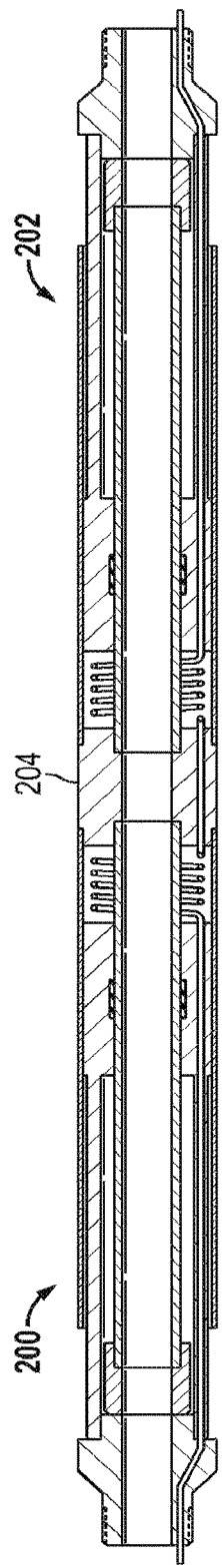
FIG. 3 is a illustration of two contraction joints coupled together with altering orientation according to embodiments of the present disclosure.

FIG. 3 illustrates another embodiment of the present disclosure in which two contraction joints are coupled together. A first joint 200 is oriented with upper sub to the left-hand side of the figure, and a second joint 202 is oriented with upper sub to the right-hand side. In place of a lower sub as shown in FIGS. 1 and 2, the joints 200 and 200 include a center sub 204 configured to couple the first and second joints together. In other embodiments, multiple joints can be coupled together with the components oriented in a similar direction. Two or more joints can be used.

Figure 4:
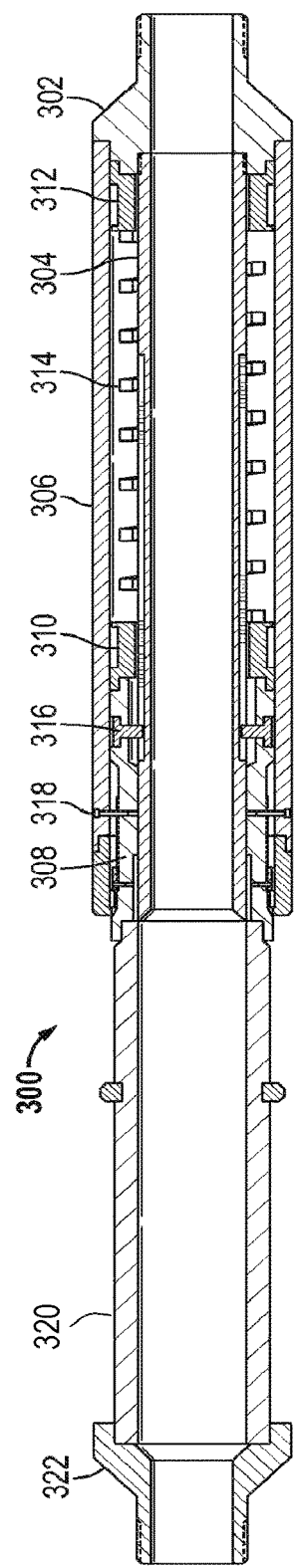
FIG. 4 is a cross-sectional view of a contraction joint according to embodiments of the present disclosure.

FIG. 4 is a cross-sectional view of a contraction joint 300 according to still further embodiments of the present disclosure. The joint 300 includes a lower sub 302, an inner mandrel 304, an external mandrel 306, an activation sub 308, upper collar 310, a lower collar 312, and a coiled control line 314. The coiled control line 314 is coupled between upper and lower collars and provides a control line (electric or hydraulic) through the joint 300. The activation sub 308 includes an anti-rotation key 316 and a shear screw 318 to maintain the components in an undeployed state with the proper rotation. The activation sub 308 is coupled to an extension 320 which can be of any desired length. The joint 300 also includes an upper sub 322. When the joint 300 is to be extended, the activation sub 308 moves along the inner mandrel 304 between the inner mandrel 204 and external mandrel 306, coiling the coiled line 314. Multiple joints 300 can be coupled together in series in a well. The joints 300 can be coupled in any suitable orientation In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A contraction joint, comprising:
an upper portion comprising:
a first mandrel;
an upper sub; and
an activation sub, wherein the first mandrel extends between the upper sub and the activation sub, and wherein the first mandrel has a smaller exterior diameter than the activation sub and the upper sub;
a lower portion comprising:
a second mandrel movably disposed within the first mandrel;
a lower sub; and
an upper shoulder movably disposed within the first mandrel, wherein the second mandrel is coupled between the lower sub and the upper shoulder, and wherein the second mandrel has smaller exterior diameter than the lower sub and the upper shoulder, wherein the upper and lower portion telescope relative to one another to move from a contracted position to an extended position, and wherein the activation sub of the upper portion is between the lower sub and upper shoulder of the lower portion to define the telescoping travel of the joint at least in part via abutting engagement between the upper shoulder and the activation sub; and
an extendible line disposed about the second mandrel and configured to expand and contract within the contraction joint as the contraction joint moves between extended and contracted positions, wherein the extendible line is coupled through the upper sub and lower sub.

2. The contraction joint of claim 1 wherein the extendible line comprises an electric line, a hydraulic line, or a combination electric line and hydraulic line.

3. The contraction joint of claim 1 wherein the extendible line is a coiled line.

4. The contraction joint of claim 1, further comprising an external mandrel covering a portion of the upper mandrel.

5. The contraction joint of claim 4 wherein the external mandrel is load-bearing.

6. The contraction joint of claim 1 wherein the contraction joint is a first contraction joint, further comprising a second contraction joint coupled to the first contraction joint.

7. The contraction joint of claim 6 wherein the second contraction joint is oriented similarly to the first contraction joint.

8. The contraction joint of claim 6 wherein the second contraction joint is oriented differently than the first contraction joint, further comprising a center sub configured to couple the contraction joints together.

9. The contraction joint of claim 1 wherein the contraction joint has an interior diameter of at least 8.5 inches.

10. A contraction joint configured to connect between a first completion component above the contraction joint and a second completion component below the contraction joint, the contraction joint comprising:
an upper portion comprising a first mandrel;
a lower portion comprising a second mandrel coupled with an upper shoulder which limits expansion of the contraction joint, the upper shoulder being movably disposed within the first mandrel, wherein the first and second mandrels are configured to telescope relative to one another to extend and contract; and
a control line extending through the contraction joint and configured to connect to the first and second completion components through the contraction joint, wherein the control line has an extendible portion disposed about the second mandrel, the extendable portion being configured to extend and contract with the contraction joint as the upper and lower portions telescope relative to one another.

11. The contraction joint of claim 10 wherein the control line comprises a hydraulic line, an electrical line, a combination electrical line, or a plurality of line in any combination of electric, hydraulic, and electro-hydraulic line.

12. The contraction joint of claim 10 wherein the contraction joint is a first contraction joint in a contraction joint system, the contraction joint system further comprising a second contraction joint coupled to the first contraction joint.

13. The contraction joint of claim 12 wherein the first and second contraction joints are oriented similarly.

14. The contraction joint of claim 12 wherein the first and second contraction joints are oriented differently, the contraction joint system further comprising a center sub between the first and second contraction joints.

15. The contraction joint of claim 10, further comprising an external load-bearing mandrel having a larger radius than the first or second mandrels.

16. The contraction joint of claim 10 wherein the control line comprises a coiled control line.

17. A method of deploying a contraction joint, comprising:
    positioning a contraction joint in a wellbore, the contraction joint including a first portion having a first mandrel, an activation sub, and an upper sub and a second portion having a second mandrel, a lower sub, an upper shoulder contained within the first mandrel, and an external mandrel, where the first and second portions telescope relative to one another and contain an expandable control line extending through the contraction joint;
    coupling the contraction joint to a first and second completion component between the first and second completion component;
    expanding the contraction joint to a suitable length between the first and second completion components by telescoping the first mandrel and activation sub along the second mandrel towards the upper shoulder and away from the lower sub;
    using the upper shoulder within the first mandrel as an abutment to prevent overextension of the contraction joint; and
    expanding a control line segment within the contraction joint to accommodate the expanded contraction joint, wherein the control line communicates between the first and second completion components through the contraction joint.

18. The method of claim 17, further comprising communicating a signal through the control line segment when the contraction joint is deployed between the first and second completion components.

19. The method of claim 17, further comprising coupling a second contraction joint to the contraction joint.

20. The method of claim 17 wherein the control line comprises an electric line, a hydraulic control line, or a combination of electric and hydraulic control lines.

* * * * *